United States Patent [19]

Borrelli et al.

[11] Patent Number: 5,148,510
[45] Date of Patent: Sep. 15, 1992

[54] OPTICAL FIBER MADE OF GALLIOBISMUTHATE GLASSES AND OPTICAL DEVICES USING SAME

[75] Inventors: Nicholas F. Borrelli, Elmira; William H. Dumbaugh, Jr., Painted Post; Doublas W. Hall, Corning; Josef C. Lapp, Corning; Mark A. Newhouse, Corning; Mark L. Powley, Corning; David L. Weidman, Corning, all of N.Y.

[73] Assignee: Corning Incorporated, Corning, N.Y.

[21] Appl. No.: 793,565

[22] Filed: Nov. 18, 1991

Related U.S. Application Data

[62] Division of Ser. No. 618,938, Nov. 28, 1990, Pat. No. 5,093,287.

[51] Int. Cl.$^5$ .................. G02B 6/00; H03F 7/00; C03C 3/12; G01B 9/02
[52] U.S. Cl. .................. 385/142; 385/28; 385/122; 385/141; 385/144; 359/334; 359/338; 359/341; 359/343; 501/37; 501/41; 501/42; 501/74; 356/345
[58] Field of Search .............. 385/123, 122, 141, 142, 385/144, 147; 359/327, 328, 329, 332, 333, 334, 338, 340, 341, 343; 501/37, 40, 41, 42, 73, 74, 904; 356/345

[56] References Cited

U.S. PATENT DOCUMENTS

| | | | |
|---|---|---|---|
| 3,841,882 | 10/1974 | Wolf | 385/142 |
| 3,859,103 | 1/1975 | Yoshiyagawa et al. | 385/142 |
| 4,110,002 | 8/1978 | Klein et al. | 385/142 |
| 4,418,985 | 12/1983 | Kasori et al. | 385/142 |
| 4,445,754 | 5/1984 | Beales et al. | 385/142 |
| 4,515,429 | 5/1985 | Smith et al. | 385/122 |
| 5,022,738 | 6/1991 | Uenishi et al. | 385/122 |
| 5,033,815 | 7/1991 | Edahiro et al. | 385/142 |
| 5,061,038 | 10/1991 | Chikuma et al. | 385/122 |
| 5,093,287 | 3/1992 | Borrelli et al. | 501/41 |
| 5,093,288 | 3/1992 | Aitken et al. | 501/42 |

Primary Examiner—Brian Healy
Attorney, Agent, or Firm—C. S. Janes, Jr.

[57] ABSTRACT

This invention is drawn to heavy metal oxide glasses exhibiting high nonlinear susceptibility and infrared transmission consisting essentially, in weight percent, of 42–48% PbO, 33–44% $Bi_2O_3$, 10–15% $Ga_2O_3$, and up to 15% total of at least one member of the group consisting of up to 5% $SiO_2$ and/or $GeO_2$ and up to 15% $Tl_2O$. This invention also comprehends the fabrication of light guiding fibers from those glasses.

9 Claims, No Drawings

5,148,510

OPTICAL FIBER MADE OF GALLIOBISMUTHATE GLASSES AND OPTICAL DEVICES USING SAME

RELATED APPLICATION

This is a division of application Ser. No. 07/618,938, filed Nov. 28, 1990, now U.S. Pat. No. 5,093,287.

U.S. application Ser. No. 618,939, filed Aug. 28, 1990, now U.S. Pat. No.. 5,093,288 by B. G. Aitken et al. under the title THALLIUM GERMANATE, TELLURITE, AND ANTIMONITE GLASSES, is directed to the production of glasses possessing high optical nonlinearity, as well as good visible and infrared transmission, which are defined within narrow composition intervals of the systems $Tl_2O$—$Bi_2O_3$—$GeO_2$—$Ga_2O_3$, $Tl_2O$—$TeO_2$ and/or $PbO$—$SiO_2$, and $Tl_2O$—$Sb_2O_3$ and/or $PbO$—$SiO_2$.

BACKGROUND OF THE INVENTION

This invention relates to galliobismuthate glasses with superior infrared transmitting ability and a high nonlinear susceptibility, thus making them suitable for various optical devices.

Active optical devices, which are currently being studied for use in future telecommunications and computational systems, require optically nonlinear materials. In such materials a light beam will change the optical properties of the medium, altering the propagation of other light beams, called cross-modulation, or of itself, called self-modulation. Many of the proposed active optical devices also require that the material have a fast response time and low optical loss. Only certain glasses satisfy these requirements.

Such a class of glasses has been identified by several workers in their investigations of heavy metal oxide (HMO) glasses, wherein the superior infrared transmitting ability of those glasses was discovered. Those glasses are unusual in that they contain none of the traditional glass-forming oxides, such as those of silicon, boron, germanium, and phosphorous, yet they exhibit remarkable stability. Many such glasses have been previously patented, but principally for infrared transmitting applications. Subsequent investigations led to the discovery that these glasses also display a high degree of nonlinear susceptibility. Measurements on representative HMO glasses have indicated a nonlinear refractive index some 50x that of vitreous silica. This factor makes these materials suitable for a range of optical applications, including areas where optical bistability, beam steering, optical phase conjugation, and bistability of resonator structures are desired. These applications require that the optical properties of the material change in response to an applied optical field, the size of this effect being characterized by a single term called the third order susceptibility tensor, $X^{(3)}$, which can be thought of as a coefficient in a power series expansion of the relationship between the applied electric field, E, and the polarization, P, written schematically as $$P = X^{(1)}E + X^{(2)}EE + X^{(3)}EEE + \ldots ,$$

where $X^{(1)}$ is the linear susceptibility tensor, $X^{(2)}$ is the second order susceptibility tensor, and so on.

One example of the physical changes that may occur in a glass is the change in the index of refraction brought about by the presence of a high-intensity light beam. When a light beam of intensity I is passed through a nonlinear medium, the index of refraction can be described by the equation $$n = n_o + \gamma I,$$

where n is the index of refraction, $n_o$ is the linear (low intensity) index, and $\gamma$ is the nonlinear refractive index. The nonlinear refractive index, in turn, is related to the susceptibility tensor by the equation $$\gamma = \frac{480\pi^2}{n_o^2 c} X^{(3)}_{1111}$$

where c is the velocity of light.

To effectively utilize these material properties in optical applications such as low loss waveguides and photonic switches, it is necessary to produce optical fibers based on these glass compositions. Consequently, a need was identified to make HMO glasses in fiber form. Both the core glass and the cladding glass must be transparent in the infrared region when optical fibers are used in the infrared region, which suggests that both the core and cladding glass compositions should be selected from glasses of generally similar compositions.

The preferred architecture of these optical waveguides is one which confines the light tightly to the core region of the fiber. A typical architecture employed in a single mode type optical fiber is the step index profile, which consists of a relatively small core region surrounded by a relatively large cladding with a lower refractive index. Thus, construction of a glass fiber with the appropriate properties to become an effective optical waveguide requires selection of two different glass compositions for the core and cladding having a compatibility of material properties and processing viscosities.

An effective optical waveguide fiber requires a difference in refractive index between the core and cladding. This difference is usually described in terms of the relative refractive index, $\Delta$, defined by the equation $$\Delta = [n_1^2 - n_2^2]/(2n_1^2),$$

where $n_1$ is the refractive index of the core glass and $n_2$ is the refractive index of the cladding glass. A $\Delta$ of $\approx 0.35\%$ is typical in a standard optical waveguide fiber, whereas, a $\Delta$ of $\approx 2.5\%$ is commonly featured in the waveguides described in the instant invention.

While smaller $\Delta$ values would allow the fabrication of a functional waveguide, these high $\Delta$ values were chosen for two reasons. First, because the fibers described in the instant invention are fabricated from melted glass instead of via the tightly controlled vapor deposition process conventionally used to form waveguides, the refractive index thereof cannot be as easily controlled. Thus, a larger $\Delta$ value allows the tolerance of more variability in the relative refractive index while still achieving a functional waveguide. Second, the nonlinear effects of interest are all a function of light intensity, which is power per unit area. When a given amount of optical power emanates from a source, such as a laser, and into an optical waveguide fiber, light is more tightly confined to a smaller core region. This tighter confinement is made possible by higher $\Delta$ values and results in larger nonlinear effects.

The material compatibility requirements of an effective optical waveguide fiber necessitate a similarity between the thermal expansion coefficients of the core and the cladding, with the core desirably having a slightly higher thermal expansion. Likewise, the processing compatibility requirements of such an optical fiber necessitate a similarity between the processing viscosities of the core and cladding, with neither glass being prone to devitrification at the processing temperatures.

Accordingly, the primary object of the present invention was to define a series of HMO glass compositions exhibiting high nonlinear susceptibility and superior infrared transmitting ability. Another object of the instant invention was to identify novel HMO glass compositions that are suitable for making optical waveguide fiber. Yet another object of the present invention was to devise effective methods of processing these HMO glasses without allowing crystallization of these glasses. A still further object of the instant invention was to provide a method of producing HMO glass optical waveguide fibers with similar processing viscosities between the core and cladding glasses, and without crystallization of either glass.

The enhanced nonlinearity of the HMO glasses described herein and waveguide structures that may be synthesized from these glasses make them useful in a number of device configurations, some of which can only be implemented in waveguide form (either fiber or planar waveguides), and some of which can also be implemented in bulk-optics form. Such devices include, but are not limited to: nonlinear mode coupling devices, nonlinear interference devices, and optical amplifiers, and areas where optical phase conjugation is desirable.

Nonlinear mode coupling devices operate through changing the coupling of two (or more) modes of a waveguide structure as a result of the third order susceptibility. They include various multi-core couplers and single-core devices where two or more modes of the waveguide structure (such as modes with different polarizations or spatial distributions) have their coupling altered through nonlinear interaction.

In nonlinear interference devices the relative phases of two or more light beams (or even various reflections of a single light beam) are changed by utilizing variations in the optical path length resulting from the third order susceptibility. Such differences are brought about by the change of index of refraction due to the nonlinearity. Representative of this group of nonlinear interference devices is a bulk or guided wave Mach-Zehnder interferometer, although Sagnac interferometers, Michelson-type interferometers, distributed feedback grating devices, and Fabry-Perot resonators may also be included.

When these HMO glasses are used in synthesizing optical amplifiers, the gain coefficients for stimulated Raman and Brillouin amplification are also enhanced. This gain can be used to amplify a signal beam using a pump beam in a guided-wave geometry.

In areas where optical phase conjugation is desired, four-wave mixing interactions (bulk or guided wave) are utilized, wherein three input optical waves interact via the third order susceptibility to form a fourth wave, called a phase conjugate wave, which has unique properties. These properties can be exploited for such uses as aberration corrections, optical memory, beam steering, generation of new wavelengths, and neural networks.

The utility of the instant invention is manifested in the aforementioned general areas of application as well as in devices in which these concepts are used. The inventive HMO glass compositions that make possible the construction of such devices can be summarized as follows.

SUMMARY OF THE INVENTION

The above objectives can be achieved within a very restricted regime of glass compositions within the $PbO-Bi_2O_3-Ga_2O_3$ system to which small, but effective, amounts of oxides selected from the group consisting of $SiO_2$, $GeO_2$, and $Tl_2O$ are added. Hence, glass compositions operable in the subject invention consist essentially, expressed in terms of weight percent on the oxide basis, of 42–48% $PbO$, 33–44% $Bi_2O_3$, 10–15% $Ga_2O_3$, and up to 15% total of at least one member selected from the group in the indicated proportion consisting of up to 5% $SiO_2$ and/or $GeO_2$, and up to 15% $Tl_2O$. When expressed in terms of cation percent on the oxide basis, the inventive glasses consist essentially of 30–50% $PbO$, 20–50% $BiO_{1.5}$, 20–30% $GaO_{1.5}$, and up to 20% total of at least one member selected from the group in the indicated proportion of up to 20% $SiO_2$, up to 15% $GeO_2$, and up to 10% $TlO_{0.5}$.

U.S. Pat. No. 4,483,931 (Dumbaugh, Jr. et al.) discloses glasses consisting essentially, expressed in terms of weight percent on the oxide basis, of 10–85% $PbO$, 5–30% $Ga_2O_3$, up to 85% $Bi_2O_3$, and up to 30% total of the following components in the indicated proportions of

| | | | | | |
|---|---|---|---|---|---|
| $Cs_2O$ | 0–20 | $ZnO$ | 0–5 | $Na_2O$ | 0–2 |
| $HgO$ | 0–30 | $K_2O$ | 0–2 | $In_2O_3$ | 0–10 |
| $Tl_2O$ | 0–20 | $Cr_2O_3$ | 0–5 | $SiO_2$ | 0–2 |
| $Sb_2O_3$ | 0–10 | $MnO_2$ | 0–5 | $ZrO_2$ | 0–5 |
| $TeO_2$ | 0–10 | $CuO$ | 0–2 | $Nb_2O_5$ | 0–5 |
| $Tb_2O$ | 0–5 | $CdO$ | 0–12 | $Ta_2O_5$ | 0–5 |
| $HfO_2$ | 0–5 | $GeO_2$ | 0–5 | Halogen | 0–5 |
| $Al_2O_3$ | 0–3 | | | | |

As is immediately evident, those extremely broad composition intervals overlap those required in the instant invention. Nevertheless, to produce glasses exhibiting high nonlinear susceptibility, while demonstrating the necessary viscosity parameters to permit the preparation of core and cladding for optical waveguide fibers, coupled with high resistance to devitrification, the compositions thereof must be maintained within the above ranges. Furthermore, to assure the desired high nonlinear susceptibility and exceptional infrared transmission, additions of $SiO_2$ and/or $GeO_2$ and $Tl_2O$ will not exceed the specified maximum for each. None of the working examples provided in the patent has a composition coming within the present inventive composition intervals.

The preferred compositions consist essentially, expressed in terms of weight percent on the oxide basis, of 43–46% $PbO$, 11–13% $Ga_2O_3$, 35–43% $Bi$ , and up to 8% total of at least one member of the group in the indicated proportion of 0.5–3% $SiO_2$ and/or $GeO_2$ and 4–8% $Tl_2O$.

Although the glasses of the instant invention were designed expressly for use in fabricating low loss optical waveguides, photonic switches, and active optical devices, it will be appreciated that they would also be operable in bulk nonlinear applications.

PRIOR ART

A plethora of glass compositions are known to the art that have infrared transmitting characteristics. Included in such optical glass compositions are, for example, isotropic crystalline alkaline earth fluorides (U.S. Pat. No. 3,502,386), antimony sulfides (U.S. Pat. No. 3,002,842), germanium-arsenic-selenides/tellurides (U.S. Pat. No. 4,154,503), arsenic trisulfides (U.S. Pat. No. 2,979,382), and strontium and gallium compounds (U.S. Pat. No. 3,188,216), as well as methods for making infrared transmitting germanate glasses (U.S. Pat. No. 3,531,305). None of the glass compositions mentioned in these references coincides with those of the instant invention.

Oxides of tellurium, tungsten, tantalum, thallium, bismuth, barium, lead, and titanium were employed in synthesizing the optical glasses of U.S. Pat. No. 3,291,620, whereas at least two members from the group consisting of tungsten, molybdenum, bismuth, and arsenic and one member selected from the group of oxides and fluorides consisting of magnesium, calcium, strontium, barium, and lead, were utilized in U.S. Pat. No. 3,531,304. Neither reference mentions the use of $Ga_2O_3$.

Optical waveguide fibers have been constructed from some of these infrared transmitting optical glasses as illustrated in U.S. Pat. Nos. 3,209,641 and 4,451,116, wherein fibers were constructed from arsenic and sulfur, and fibers were extruded from halides of thallium, respectively.

U.S. Pat. No. 3,723,141 (Dumbaugh, Jr.) is directed to the formation of infrared transmitting glasses consisting essentially, expressed in terms of weight percent on the oxide basis, of 10–85% Bi 10–75% PbO, $Bi_2O_3 +$ PbO > 60%, 2–25% BaO, 1–10% ZnO, $SiO_2 + B_2O_3 +$ $P_2O_5 < 1$%, and up to 20% total of the following components in amounts not exceeding 10% individually: CaO, SrO, CdO, HgO, $Tl_2O_3$, $TiO_2$, $GeO_2$, $Sb_2O_3$, $As_2O_3$, the transition metal oxides, and the alkali metal oxides. $Ga_2O_3$ is nowhere mentioned in the patent.

U.S. Pat. No. 3,837,867 (Dumbaugh, Jr.) is concerned with infrared transmitting glasses consisting essentially, expressed in terms of cation percent on the oxide basis, of 33–68% PbO, 2.5–27% CdO, 10–30% $Fe_2O_3$, and 4–28% $Tl_2O$. Those ranges correspond to the following approximate weight percentages: 40–80% PbO, 4–35% $Tl_2O$, 2–22% CdO, and 4–15% $Fe_2O_3$. $Ga_2O_3$ is nowhere referred to in the patent.

U.S. Pat. No. 3,837,868 (Berleue et al.) describes infrared transmitting glasses consisting essentially, expressed in terms of cation percent on the oxide basis, of 8–80% $Bi_2O_3$, 0–57% PbO, 0–32% CdO, at least 5% PbO-CdO, 5–32.5% $Fe_2O_3$, and 0–15% other compatible glassmaking constituents. $Ga_2O_3$ is nowhere mentioned in the patent and $SiO_2$ is preferably absent from the compositions.

U.S. Pat. No. 4,456,692 (Dumbaugh, Jr. et al.) discloses lead-free glasses consisting essentially, expressed in terms of weight percent on the oxide basis, of 40–90% $Bi_2O_3$, 5–30% $Ga_2O_3$, 0–35% CdO (the preferred glasses contain 4–28% CdO), up to 3% chlorine, and up to 30% total of the following oxides in the indicated proportions of 0–10% $Cs_2O$, 0–25% HgO, 0–3% $GeO_2$, and 0–4% $Sb_2O_3$. The glass compositions are stated explicitly to be free of lead.

In "Nonlinear Optical Properties of Glasses and Glassor Gel-Based Compositions," *Optical Engineering*, 26, pp. 102–106, February 1987, Hiroyuki Nasu and John MacKenzie discuss the potentially large optical nonlinearity of the following two glass compositions originally covered by U.S. Pat. Nos. 4,456,692 and 4,483,931, supra, expressed in terms of weight percent on the oxide basis:

83% $Bi_2O_3$, 7.2% $Ga_2O_3$, and 9.8% CdO; and
42% $Bi_2O_3$, 46% PbO, and 12% $Ga_2O_3$ No reference is made to additions of $SiO_2$ and/or $GeO_2$.

Similarly, U.S. Pat. No. 4,790,619 details a Ramanactive optical fiber having very large Raman cross section, said fiber comprising two major components, a glass-forming first component ($GeO_2$, $SiO_2$, $AsO_{1.5}$, or combinations thereof) and a heavy metal oxide second component (PbO, $BiO_{1.5}$, $SbO_{1.5}$, $TlO_{0.5}$, or combinations thereof), with said first and second major components making up at least 70 mol%, preferably at least 90 mol%, of the glass. Although the stated reference details germanate glass compositions suitable for making devices from Raman-active optical fiber, the composition of said optical fiber is vastly different from those of the instant invention; $Ga_2O_3$ is not mentioned.

French Patent No. 1,549,090 discloses a number of glasses that are transparent to infrared rays having compositions within the system $GeO_2$—$Bi_2O_3$ and/or $Tl_2O_3$ wherein PbO and/or $PbF_2$ may optionally be present. No reference is made to $Ga_2O_3$.

In "Third Order Nonlinear Integrated Optics," Journal of Lightwave Technology, 6, pp. 953–967, June 1988, G. I. Stegeman, E. M. Wright, N. Finlayson, R. Zanoni, and C. T. Seaton discuss, in generic terms, the scientific principles that make possible the construction of nonlinear optical devices from optical waveguides, namely Mach-Zehnder interferometers, grating and prism couplers, grating reflectors, directional couplers, and mode sorters. Though many of these devices coincide with those of the instant invention, no reference is made to specific glass compositions that are suitable for such devices.

In a paper presented at the Nonlinear Optics conference held in Kauai, Hawaii on Jul. 16–20, 1990, entitled "Two-Photon Absorption in High-Nonlinearity Fibers," D. L. Weidman, J. C. Lapp, and M. A. Newhouse make general reference to the fabrication of a multimode lead-bismuthgallate composition fiber. However, no specific glass composition is disclosed.

DESCRIPTION OF PREFERRED EMBODIMENTS

Table I records a group of glasses comprised of $SiO_2$ additions of 1, 2, 3, 5, 10, and 15 cation percent to a base composition consisting essentially, expressed in terms of cation percent on the oxide basis, of 40% PbO, 25% $GaO_{1.5}$, and 35% $BiO_{1.5}$. Table IA reports that group of glasses in terms of parts by weight. Because the sum of the individual components totals 100 or very closely approximates 100, for all practical purposes the values listed may be deemed to represent weight percent.

Glass batches were prepared from reagent grade bismuth trioxide (99.0%), red lead oxide (25.43% PbO, 74.57% $Pb_3O_4$), high purity gallium oxide (99.99%), and Silcosil 75 sand (99.8% $SiO_2$) The batches were compounded in amounts large enough to produce 500 grams of glass, tumble mixed together for 30 minutes to aid in obtaining a homogeneous melt, and thereafter charged into platinum or gold crucibles. The crucibles were moved into a furnace operating at temperatures between about 950°–1050° C. and the batches melted in an air atmosphere for about 30 minutes. The melts were cast into stainless steel molds and annealed for one hour at temperatures between about 335°–375° C. Samples were cut and polished utilizing processes conventional in the glass art.

TABLE I

| | 1 | 2 | 3 | 4 | 5 | 6 | 7 |
|---|---|---|---|---|---|---|---|
| PbO | 40 | 40 | 40 | 40 | 40 | 40 | 40 |
| $GaO_{1.5}$ | 25 | 25 | 25 | 25 | 25 | 25 | 25 |
| $BiO_{1.5}$ | 35 | 35 | 35 | 35 | 35 | 35 | 35 |
| $SiO_2$ | — | 1 | 2 | 3 | 5 | 10 | 15 |

TABLE IA

| | 1 | 2 | 3 | 4 | 5 | 6 | 7 |
|---|---|---|---|---|---|---|---|
| PbO | 46.0 | 45.82 | 45.68 | 45.54 | 45.27 | 44.59 | 43.93 |
| $Ga_2O_3$ | 12.1 | 12.02 | 11.99 | 11.95 | 11.88 | 11.70 | 11.53 |
| $Bi_2O_3$ | 41.9 | 41.85 | 41.72 | 41.60 | 41.33 | 40.71 | 40.12 |
| $SiO_2$ | — | 0.31 | 0.61 | 0.92 | 1.52 | 3.00 | 4.43 |

As was explained above, glasses having compositions within the simple $PbO-Bi_2O_3-Ga_2O_3$ ternary system generally exhibit poor glassworking properties and stability against crystallization. Thus, the primary reason for adding $SiO_2$ or $GeO_2$ to these glasses is to improve the workability of the glass, as indicated by its stability against devitrification. Table II records the glass transition temperature ($T_g$) and the onset of crystallization temperature ($T_x$) for each of the above samples, as determined by differential scanning calorimetry. Also recorded is the difference in temperature between those two values for each glass. This difference is commonly used as an indication of the stability of the glass against devitrification upon reheating.

TABLE II

| | 1 | 2 | 3 | 4 | 5 | 6 | 7 |
|---|---|---|---|---|---|---|---|
| $T_g$ | 326 | 330 | 333 | 337 | 345 | 350 | 368 |
| $T_x$ | 402 | 412 | 420 | 445 | 449 | 468 | 495 |
| $T_x-T_g$ | 76 | 82 | 87 | 108 | 104 | 118 | 127 |

As can be observed, both the $T_g$ and the $T_x$ of the base glass composition increase as the $SiO_2$ content is raised, with the $T_x$ temperature rising more rapidly than the $T_g$. That circumstance gives rise to an increase in the difference between the two temperatures, which difference opens a larger spread of temperatures available for processing the glasses. A very practical benefit resulting from that phenomenon has been the visibly superior surface quality manifested on cane and fiber drawn from the $SiO_2$-containing glasses.

Based upon the behaviors exhibited by the $SiO_2$-containing glasses regarding their $T_g$ and $T_x$, it was expected that the viscosities of the glasses in the range of the softening point, the region of great interest for redrawing techniques, would tend to improve with $SiO_2$ and/or $GeO_2$ additions. This does not appear to be the case with these glasses, however, because, whereas the addition of $SiO_2$ and/or $GeO_2$ does appear to shift the isokomal points (points of constant viscosity) of the glasses to higher temperatures, the slope of the curves, as measured by the activation energy, tends to remain constant. Accordingly, it appears that the addition of $SiO_2$ and/or $GeO_2$ at the above levels does not exert a significant impact on the rate of which the glass viscosity changes with temperature. That situation emphasizes the need for close temperature control in the production of articles from these glasses.

Nevertheless, the addition of $SiO_2$ and/or $GeO_2$ has proven beneficial in the following three vital physical property areas:

First, upon reheating, the addition of $SiO_2$ and/or $GeO_2$ increases the stability of the glass with respect to devitrification, resulting in a wider range of temperatures available for processing the glasses;

Second, a relatively small addition of $SiO_2$ and/or $GeO_2$ causes a decrease in the refractive index of the glass, which phenomenon has the very practical advantage in that only a slight increase in the $SiO_2$ and/or $GeO_2$ content of the cladding glass vis-a-vis the core glass is sufficient to yield a light guiding fiber; and Third, the addition of $SiO_2$ and/or $GeO_2$ slightly lowers the linear coefficient of thermal expansion; such addition to the cladding glass of a waveguide places the cladding glass under compression. For example, the 10 cation percent ($=3$ weight percent) addition of $SiO_2$ in Example 6 above, reduces the coefficient of thermal expansion of Example 1 from about $112\times10^{-7}/°$ C. to $110\times10^{-7}/°$ C. ($25°-300°$ C.). That difference of about 2% is low enough to preclude catastrophic breakage, and it has the beneficial effect of placing the cladding under a slight degree of compression.

While Examples 1-7 are directed to the addition of in increasing glass stability, manipulating the refractive index of the glass, and lowering the coefficient of thermal expansion, the addition of $GeO_2$ has a similar effect.

EXAMPLE 8

A glass article having the composition, expressed in terms of weight percent on the oxide basis, of 46.25% PbO, 35.01% $Bi_2O_3$, 12.14% $Ga_2O_3$, and 6.6% $Tl_2O$ was prepared in like manner to Examples 1-7 above. The effect upon the optical properties exhibited by the above glass in response to an applied optical field was investigated. The size of this effect is characterized in the art by the third order susceptibility tensor $X^{(3)}$. One element of this tensor, $X^{(3)}_{1111}$, has typically been utilized as a basis for that characterization. The largest measurement of $X^{(3)}_{1111}$ for a glass reported in the scientific literature has been $13.1\times10^{-14}$ esu for a tellurite composition. The $X^{(3)}_{1111}$ value of Example 8 was measured at $42\times10^{-14}$ esu, more than three times greater than that of the literature material.

As can be appreciated, in the fabrication of waveguides an appropriate selection of materials for a complementary core and cladding would be a pair of materials in which the desired difference in refractive index is obtained, while minimizing differences demonstrated in the other physical properties, such as thermal expansion. As has been illustrated above, the changes in refractive index roughly parallel the changes in the thermal expansion coefficient. Hence, the compositional alterations required to achieve a desired difference in refractive index produce only slight changes in the coefficient of thermal expansion. With respect to the fabrication of waveguides, the reduction in refractive index leads to a desirable decrease in the thermal expansion coefficient.

The addition of $SiO_2$ and/or $GeO_2$ to the base $PbO-Bi_2O_3-Ga_2O_3$ glass composition reduces the nonlinear susceptibility thereof. That is, because the nonlinear susceptibility of the base glass is directly related to the levels of heavy metal cations comprising the composition thereof, dilution of those levels of heavy metal cations results in a degradation of nonlinear properties. Furthermore, $SiO_2$ and $GeO_2$ exert a very substantial effect upon the working characteristics and stability of the glasses. Those two factors have led to limiting the additions of $SiO_2$ and/or $GeO_2$ to no more than about 5% by weight, preferably no more than about 3% by weight. Tl$_2$O appears to improve the nonlinear susceptibility of the glasses.

One common approach for making a light guiding fiber is termed the "rod-in-tube" technique. This process contemplates thermally collapsing a cladding tube onto a core rod. This procedure has encountered a chronic problem when used with HMO glasses; viz., a poor interface results between the core and cladding glasses which acts as a source of high scattering loss and leads to a poorly transmitting fiber. Furthermore, devitrification of the glasses during the collapsing and fiber drawing steps has been experienced. The use of the present inventive glasses has ameliorated those problems to a great extent. However, we have now developed a forming method for making light guiding fiber which virtually assures excellent light transmitting properties.

The inventive technique involves eight basic steps:

First, preparing a core rod, conveniently by casting molten glass of the core composition into a mold;

Second, removing the rod from the mold and hanging it vertically in an annealing chamber at the appropriate annealing temperature for the core glass;

Third, preparing a melt of the cladding glass composition;

Fourth, cooling the melt of cladding glass composition to a temperature at which the melt demonstrates a viscosity of $10^2$–$10^5$ poises;

Fifth, placing the container holding the cooled cladding glass under the core rod in the annealing chamber;

Sixth, raising the container and/or lowering the core rod to immerse at least a portion of the core rod into the cladding glass to apply a coating of the cladding glass onto the core rod;

Seventh, lowering the container and/or raising the core rod to remove the core rod from the cladding glass; and then Eighth, drawing the coated rod to a fiber of desired dimensions.

Coatings of cladding glass having thicknesses of about 0.15" have routinely been prepared. Multiple coating steps can be undertaken where desired. Large core, step index, multimode light guiding fibers produced directly from dip coated rod fabricated according to the above procedure have demonstrated losses on the order of 5–15 dB/m.

Two highly significant benefits arise from this inventive technique:

(a) the coating is made at a sufficiently high temperature to produce a well-bonded, high quality interface between the core and cladding glasses; and (b) the surface crystallization of the less stable core glass is avoided during both the coating process and subsequent drawing steps.

A single mode light guiding fiber can be prepared utilizing the following four steps:

(1) a rod having a diameter of about 1–2 mm is prepared by drawing a dip coated core rod produced in accordance with the above-described seven step procedure;

(2) this rod is inserted within a tube of cladding glass conveniently prepared either mechanically by drilling a casting of cladding glass or by some alternative nonmechanical means, such as spin casting;

(3) this combination is drawn into a composite rod having a diameter of about 1–2 mm;

(4) Step (2) is repeated with the composite rod as needed such that when Step (3) is repeated, a fiber is drawn having an outside diameter of about 150–200 μm and a core diameter of about 2–3 μm.

As was explained above, for an optical waveguide fiber to operate properly, there must be a difference in refractive index existing between the core and cladding. This difference is dependent upon the type of waveguide, i.e, a single mode or multimode, and upon the use of the waveguide, e.g., whether the fiber is used in a straight configuration or whether bent. Accordingly, whereas both the core and the cladding glasses can be prepared from compositions within the same inventive ranges, it will be appreciated that the compositions of the core and cladding glasses will be sufficiently dissimilar to achieve a desired difference in refractive index between the core and cladding.

Whereas the principles of the instant invention have been described above in connection with specific embodiments and particular modifications thereof, it is to be clearly understood that this description is made only by way of example, and not as a limitation to the scope of the invention. Said principles may be otherwise embodied within the scope of the following claims.

We claim:

1. In a light guiding fiber consisting of a core portion and a cladding portion, the improvement comprising said core portion being composed of a glass consisting essentially, expressed in terms of weight percent on the oxide basis, of 42–48% PbO, 33–44% Bi$_2$O$_3$, 10–15% Ga$_2$O$_3$, and up to 15% total of at least one member selected from the group in the indicated proportion consisting of up to 5% SiO$_2$ and/or GeO$_2$ and up to 15% Tl$_2$O, and said cladding portion being composed of a glass consisting essentially, expressed in terms of weight percent on the oxide basis, of 42–48% PbO, 33–44% Bi$_2$O$_3$, 10–15% Ga$_2$O$_3$, and up to 15% total of at least one member selected from the group in the indicated proportion consisting of up to 5% SiO$_2$ and/or GeC$_2$ and up to 15% Tl$_2$O such that said cladding and core portions are sufficiently dissimilar in composition to achieve a desired difference in refractive index therebetween.

2. A light guiding fiber according to claim 1 wherein said cladding and core portions comprise a glass consisting essentially of 43–46% PbO, 35–43% Bi$_2$O$_3$, 11–13% Ga$_2$O$_3$, and up to 8% total of at least one members of the group in the indicated proportion consisting of 0.5–3% SiO$_2$ and/or GeO$_2$ and 4–8% Tl$_2$O.

3. In a nonlinear mode coupling device comprising a multi-core coupler wherein the coupling between at least two modes of a waveguide structure is altered by nonlinear interaction, the improvement comprising a waveguide structure consisting of a core portion composed of a glass consisting essentially, expressed in terms of weight percent on the oxide basis, of 42–48% PbO, 33–44% Bi$_2$O$_3$, 10–15% Ga$_2$O$_3$, and up to 15% total of at least one member selected from the group in the indicated proportion consisting of up to 5% SiO$_2$ and/or GeO$_2$ and up to 15% T120, and a cladding portion composed of a glass consisting essentially, expressed in terms of weight percent on the oxide basis, of 42–48% PbO, 33–44% Bi$_2$O$_3$, 10–15% Ga$_2$O$_3$, and up to 15% total of at least one member selected from the group in the indicated proportion consisting of up to 5% SiO$_2$ and/or GeO$_2$ and up to 15% Tl$_2$O such that said cladding and core portions are sufficiently dissimilar in composition to achieve a desired difference in refractive index therebetween.

4. In a nonlinear mode coupling device comprising a single core device wherein the coupling between at least two modes of a waveguide structure is altered by nonlinear interaction, the improvement comprising a waveguide structure consisting of a core portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% T120, and a cladding portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$ such that said cladding and core portions are sufficiently dissimilar in composition to achieve a desired difference in refractive index therebetween.

5. In a nonlinear interference device of the guided wave type wherein the phases of at least two direct and/or reflected light beams are altered by utilizing variations in the optical path length resulting from third order susceptibility, the improvement comprising a waveguide structure consisting of a core portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$, and a cladding portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$ such that said cladding and core portions are sufficiently dissimilar in composition to achieve a desired difference in refractive index therebetween.

6. In a nonlinear interference device of the bulk optics type employing a nonlinearly active optical element wherein the phases of at least two direct and/or reflected light beams are altered by utilizing variations in the optical path length resulting from third order susceptibility, the improvement comprising a nonlinearly active optical element composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$.

7. In a Raman or Brillouin amplifier wherein a signal beam is combined with a pump beam and is amplified by the pump beam utilizing stimulated Raman or Brillouin scattering, said amplifier having as its active optical medium a waveguide, the improvement comprising a waveguide consisting of a core portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$, and a cladding portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$ such that said cladding and core portions are sufficiently dissimilar in composition to achieve a desired difference in refractive index therebetween.

8. In an optical phase conjugator, wherein three optical waves interact through third order susceptibility to form a fourth, phase conjugate wave, said optical phase conjugator being of the guided wave type, the improvement comprising a waveguide structure consisting of a core portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$, and a cladding portion composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$ such that said cladding and core portions are sufficiently dissimilar in composition to achieve a desired difference in refractive index therebetween.

9. In an optical phase conjugator, wherein three optical waves interact through third order susceptibility to form a fourth, phase conjugate wave, said optical phase conjugator being of the bulk optics type employing a nonlinearly active optical element, the improvement comprising a nonlinearly active optical element composed of a glass consisting essentially, expressed in terms of weight percent on the oxide basis, of 42–48% PbO, 33–44% $Bi_2O_3$, 10–15% $Ga_2O_3$, and up to 15% total of at least one member selected from the group in the indicated proportion consisting of up to 5% $SiO_2$ and/or $GeO_2$ and up to 15% $Tl_2O$.

* * * * *

UNITED STATES PATENT AND TRADEMARK OFFICE
CERTIFICATE OF CORRECTION

PATENT NO. : 5,148,510                                   Page 1 of 2

DATED : September 15, 1992

INVENTOR(S) : Nicholas F. Borrelli, William H. Dumbaugh, Jr., Douglas W. Hall, Josef C. Lapp, Mark A. Newhouse, Mark L. Powley, David L. Weidman It is certified that error appears in the above-identified patent and that said Letters Patent is hereby corrected as shown below:

In column 4, line 55, "Bi" should read --$Bi_2O_3$--.

In column 5, line 29, "Bi" should read --$Bi_2O_3$--.

In column 5, line 55, "Ga2O3" should read --$Ga_2O_3$--.

In column 5, line 58, "Cs2O" should read --$Cs_2O$--.

In column 6, line 2, place a period after $Ga_2O_3$.

In column 8, line 13, "=3" should read --$\approx 3$--.

In column 8, line 20, "of in" should read --of $SiO_2$ in--.

IN THE CLAIMS

Col. 10, claim 1, line 39, "$GeC_2$" should read --$GeO_2$--.

UNITED STATES PATENT AND TRADEMARK OFFICE
CERTIFICATE OF CORRECTION

PATENT NO. : 5,148,510

DATED : September 15, 1992

INVENTOR(S) : Nicholas F. Borrelli, William H. Dumbaugh, Jr., Douglas W. Hall, Josef C. Lapp, Mark A. Newhouse, Mark L. Powley, David L. Weidman It is certified that error appears in the above-indentified patent and that said Letters Patent is hereby corrected as shown below:

Col. 10, claim 3, line 59, "Tl20" should read --$Tl_2O$--.

Col. 11, claim 4, line 11, "Tl20" should read --$Tl_2O$--.

Signed and Sealed this

Fourteenth Day of September, 1993

Attest:

BRUCE LEHMAN

Attesting Officer

Commissioner of Patents and Trademarks